US012796696B2

(12) United States Patent
Lynch

(10) Patent No.: US 12,796,696 B2
(45) Date of Patent: Nov. 17, 2026

(54) COMPOSITIONS HAVING HIGH POULTRY PROTEIN CONTENT AND METHOD OF MAKING AND USING THE SAME

(71) Applicant: INTERNATIONAL DEHYDRATED FOODS, INC., Springfield, MO (US)

(72) Inventor: Stephanie Lynch, Springfield, MO (US)

(73) Assignee: INTERNATIONAL DEHYDRATED FOODS, INC., Springfield, MO (US)

( * ) Notice: Subject to any disclaimer, the term of this patent is extended or adjusted under 35 U.S.C. 154(b) by 184 days.

(21) Appl. No.: 18/074,833

(22) Filed: Dec. 5, 2022

(65) Prior Publication Data

US 2023/0109309 A1 Apr. 6, 2023

Related U.S. Application Data

(62) Division of application No. 15/750,760, filed as application No. PCT/US2016/045867 on Aug. 5, 2016, now abandoned.

(60) Provisional application No. 62/202,657, filed on Aug. 7, 2015.

(51) Int. Cl.
*A21D 2/26* (2006.01)
*A23J 3/04* (2006.01)
*A23L 7/117* (2016.01)
*A23L 33/17* (2016.01)

(52) U.S. Cl.
CPC ................ *A21D 2/261* (2013.01); *A23J 3/04* (2013.01); *A23L 7/117* (2016.08); *A23L 33/17* (2016.08); *A23V 2002/00* (2013.01)

(58) Field of Classification Search
USPC .......................................................... 426/622
See application file for complete search history.

(56) References Cited

U.S. PATENT DOCUMENTS

| | | | | |
|---|---|---|---|---|
| 3,251,697 | A | 5/1966 | Hans | |
| 5,244,689 | A | 9/1993 | Slimak et al. | |
| 5,688,547 | A | 11/1997 | Ritchey et al. | |
| 6,013,294 | A | 1/2000 | Bunke et al. | |
| 2001/0002269 | A1 | 5/2001 | Zhao | |
| 2005/0013197 | A1 | 1/2005 | Chung et al. | |
| 2005/0208180 | A1 | 9/2005 | Engleson et al. | |
| 2005/0233053 | A1 | 10/2005 | Shen et al. | |
| 2007/0276127 | A1 | 11/2007 | Hultin et al. | |
| 2010/0303991 | A1 | 12/2010 | Karwowski et al. | |
| 2010/0310747 | A1* | 12/2010 | Paulus | A21D 13/60 426/549 |
| 2013/0129864 | A1* | 5/2013 | Brandt | A21D 8/045 426/549 |
| 2014/0106049 | A1 | 4/2014 | Fillmore | |
| 2015/0056337 | A1* | 2/2015 | Fahey-Burke | A21B 3/133 426/94 |
| 2015/0305369 | A1 | 10/2015 | Dake et al. | |

FOREIGN PATENT DOCUMENTS

| | | | |
|---|---|---|---|
| EP | 1210880 A1 | 6/2002 | |
| JP | S5774061 A | 5/1982 | |
| JP | 2007028938 A | 2/2007 | |
| KR | 20130123131 A | 11/2013 | |
| WO | WO 2011/015444 A1 | 2/2011 | |

OTHER PUBLICATIONS

APC: Andrea's Protein Cakery: Basic Protein Bread; published online at least by Apr. 18, 2014 at: https://web.archive.org/web/20140418150319/https://www.proteincakery.com/basic-protein-bread/ (Year: 2014).*
A. IDF: Spray-dried meat powders; published online at least by Jan. 17, 2007 at: https://web.archive.org/web/20070117090331/http://www.idf.com/Dehydratedingredeints/SD_MeatPowders.htm (Year: 2007).*
B. IDF: Company home page, published online at least by Apr. 7, 2014, at: https://web.archive.org/web/20140407093927/http://idfrealfood.com/#sample-page (Year: 2014).*
Azumi Hida et al: "Effects of Egg White Protein Supplementation on Muscle Strength and Serum Free Amino Acid Concentrations", Nutrients, vol. 4, No. 12, Dec. 19, 2012 (Dec. 19, 2012), pp. 1504-1517, XP055181750, ISSN: 2072-6643, DOI: 10.3390/nu4101504.
European Communication pursuant to Article 94(3) EPC in corresponding EP Application No. EP16835714.3, dated Apr. 15, 2024, 21 pages.
Canadian Patent Application No. 2,994,835 Office Action dated Nov. 7, 2023, 3 pages.
Mexican Patent Application No. MX/a/2018/001570 Office Action dated Jul. 11, 2023 with English summary, 8 pages.
Canadian Patent Application No. 2,994,835 Office Action dated Jun. 23, 2023. 3 pages.
MY: Mary Younkin: Kitchen Tips: How to Make Homemade Chicken Stock, published at Barefeet in the Kitchen, online Mar. 23, 2013 at: https://barefeetinthekitchen.corn/how-to-make-homemade-chicken-stock/ as evidenced by the first comment by Mary X. Year: 2013.
Lee: What is the Purpose of Lecithin?; Healthy Eating; published online at least by Sep. 6, 2013 at: https://web.archive.org/web/20130906151602/https://healthyeating.sfgate.corn/purpose-lecithin-3558.htra (Year: 2013).
LI: Bioactivities of Chicken Essence; vol. 77, Nr. 4, 2012Journal of Food Science ; published: Mar. 20, 2012 (Year: 2012).
Yoon: KR20130123131, Beverage composition containing chicken meat, published Nov. 12, 2013. (Year: 2013).
Dake: U.S. Appl. No. 61/985,270, filed Apr. 28, 2014 (Year: 2014).
European Patent Application No. 168357143, Communication pursuant to Article 94(3) EPC, dated Mar. 9, 2021, 5 pages.
Database WPI, Week 200721, Thompson Scientific, London, GB; AN 2007-023426, XP002789595, 2 pages.
Tomoya: Publication No. JP 2012-135257 A; published Jul. 19, 2012.

(Continued)

*Primary Examiner* — Brent T O'Hern
(74) *Attorney, Agent, or Firm* — Cozen O'Connor

(57) ABSTRACT

Products made from poultry proteins are disclosed. These products may contain high levels of chicken proteins and may be in the form of a baked or extruded solid, or in a liquid form. Methods of making these products are also described.

10 Claims, No Drawings

(56) References Cited

OTHER PUBLICATIONS

International Patent Application No. PCT/US2016/045867; International Search Report and Written Opinion dated Oct. 5, 2016; 8 pgs.
European Patent Application No. 16835714.3; Extended European Search Report and Opinion dated Mar. 22, 2019; 9 pgs.
RDA Guidelines: National Research Council (US) Subcommittee on the Tenth Edition of the Recommended Dietary Allowances. Washington (DC): National Academies Press (US); 1989. (Year: 1989).
RDA Guidelines: Table 6.1 of the National Research Council (US) Subcommittee on the Tenth Edition of the Recommended Dietary Allowances. Washington (DC): National Academies Press (US); 1989. (Year: 1989).
Mekata: Blood Substrates and Hormonal Responses to Increased Egg White Protein Intake Prior to a 12,000 m Run in Heat; J Nutr Sci Vitaminol, 54, 154-162, 2008. (Year: 2008).
Sears: Zone meals in seconds; published Mar 17, 2009. (Year: 2009).
Bao: published as CN101467711B on Apr. 6, 2011. (Year: 2011).
Non-final office action is related U.S. Appl. No. 18/074,033, mailed May 29, 2025.
Wikipedia, "Pasteurization", https://web.archive.org/web/20130120184301/https://en.wikipedia.org/wiki/Pasteurization, Jan. 20, 2023, 5 pages.
Karthikeyan, "Production and Optimization of Meat Protein Based Health Beverage", Int. J. Curr. Microbiol. App. Sci, vol. 3, No. 2, Feb. 2014, pp. 929-932.
Burkowski, "Food Product Design: Phospholipids: Putting More Function Intofunctional Foods", Oct. 22, 2012, 2 pages.
U.S. Appl. No. 18/074,033 Final Office Action dated Oct. 30, 2025, 17 pages.

* cited by examiner

COMPOSITIONS HAVING HIGH POULTRY PROTEIN CONTENT AND METHOD OF MAKING AND USING THE SAME

RELATED APPLICATION

This application is a divisional of U.S. patent application Ser. No. 15/750,760 filed Feb. 6, 2018, which is a 35 U.S.C. § 371 filing of International Application No. PCT/US2016/045867, filed Aug. 5, 2016, which claims the benefit of priority to U.S. Patent Application No. 62/202,657 filed Aug. 7, 2015. The entire content of each of the above applications is hereby incorporated by reference into this application.

BACKGROUND

Chicken proteins, or proteins derived from other poultry or other meat and fish, are not commonly used in baked or extruded snacks. No specific forms of these proteins have been developed commercially so that they can be conveniently incorporated into the baked or extruded snack products. Liquid products such as soups, broths, and nutrition beverages likewise do not contain substantial amount of chicken-derived proteins. For example, homemade soups or broths are typically prepared by cooking whole or parts of raw or cooked chicken. These soups and broths made from this process contain minimal amount of protein, usually less than 4%. Commercial or retail soups and broths also contain minimal protein due to processing limitations and lack of chicken proteins that can be easily adapted to this category of food products.

SUMMARY

The present disclosure provides a number of unique, novel products that efficiently provide higher levels of needed protein with essential amino acids in delivery formats that have not been used before.

In one embodiment, the finished products described herein may be regarded as a snack, a treat, or a supplement.

In another embodiment, these products in the baked and extruded formats may provide a higher level of chicken protein than the protein levels seen in products of similar nature.

In another embodiment, these products may provide a safe and convenient way to take in chicken protein without having to handle or cook raw chicken.

In one embodiment, the disclosed products may also reduce the concerns or risk of cross-contamination by salmonella or other pathogenic organisms. In another embodiment, the disclosed products may also reduce the risk of infection due to under-cooking of poultry or other animal products.

Chicken and other poultry proteins may provide complete, highly digestible and nutritious proteins for all ages and situations. Chicken protein is a very efficient protein, delivering all the essential amino acids in a minimum amount of food. This feature is especially beneficial for individuals who can only ingest limited amount of protein per day.

In one aspect, chicken is a highly versatile food component usable in many forms and dishes. It has the qualities of meat but can be presented in many different flavors.

In another aspect, the disclosed products deliver high quality chicken proteins in an easy to use form that is acceptable to most consumers.

In one embodiment, the liquid UHT Beverage format may be advantageous for medical purposes. The liquid product may be suitable for drinking or may be adaptable for tube feeding. When chicken protein in the form of soluble or dispersible powder is used, nutritional value is increased.

In another embodiment, also disclosed here are baked products in the form of crackers, crisps, and the like, which may contain high amounts of chicken proteins.

In one embodiment, a nutritional composition is disclosed which may contain more than 3%, 4%, 5% or 10% (w/w) animal protein. The nutritional composition may be prepared by (a) adding an animal protein composition into a liquid composition and (b) mixing the animal protein composition with the liquid composition without cooking to prepare the nutritional composition. According to the instant disclosure, no cooking step is involved after the animal protein composition is added to the liquid composition. For purpose of this disclosure, "cooking" means raising the temperature of a composition to above 70 C for a substantial period of time, for example, for 2 minutes or longer. In one aspect, the liquid composition may contain less than 1%, 0.5%, 0.1%, 0.01%, or 0% (w/w) of animal protein before mixing with the animal protein composition to prepare the nutritional composition. In one aspect, the nutritional composition may be in a liquid form or it may be processed into a solid form for ease of storage and transportation. In another aspect, the nutritional composition may be in solid form and may be reconstituted into a liquid form before being consumed or before being sold in retail store.

In another embodiment, the nutritional composition is in a liquid form and is selected from the group consisting of a soup, an infant formula, a nutritional beverage, a nutritional shake, an emulsified shake, and a flavored drink. In another embodiment, the nutritional composition does not contain any visible animal meat pieces. For purpose of this disclosure, "visible" is used to refer to something that can be seen by a naked eye of a human.

In another embodiment, the nutritional composition may be pasteurized by a means selected from the group consisting of high pressure processing (HPP), high temperature short time (HTST), Ultra-High Temperature (UHT) processing and combination thereof.

In another embodiment, a solid composition comprising animal protein and flour is disclosed wherein the solid composition comprises at least 10%, 20%, 30% or 40% (w/w) of animal protein. In one aspect, the solid composition may be made into a snack, a treat, or a crouton. Crouton may be used in salads, among other applications. Examples of snack may include but are not limited to a cracker, a chip, and a puff ball. Example of a treat may include a pet treat. In another aspect, the solid composition may be baked or extruded into the snack or crouton. Example of flour may include but are not limited to wheat flour, soy flour, corn flour, lentil flour, barley flour and combination thereof. In one embodiment, the flour used for making the solid composition is gluten free. In another embodiment, the solid composition is gluten free.

Example of animal protein may include but are not limited to poultry protein, fish protein, beef protein, and pork protein, among others. In one aspect, the animal protein is chicken protein. In another aspect, the animal protein composition may be a protein powder having at least 20%, 30% or 40% (w/w) chicken protein. In another aspect, the chicken protein contains complete amino acids that meet at least 90%, or 100% nutrition requirement of an individual selected from the group consisting of the elderly and children. For purpose of this disclosure, the terms "protein" and "proteins" may be used interchangeably, and may both refer to a collection of different proteins derived from certain source, such as a specific animal.

DETAILED DESCRIPTION

The instant disclosure provides products having high quality poultry protein. In one aspect, the products may be prepared as a snack, a treat, a supplement, or a beverage. In another aspect, the products may be prepared as a baked chip, an extruded solid product, or as a liquid product.

In one embodiment, a liquid beverage product may be prepared by using chicken proteins as one of the components. In one aspect, the chicken proteins may constitute 1%, 2%, 3%, 4%, 5%, 8%, 10% or more of the liquid beverage product.

In another embodiment, a liquid, drinkable, nutritionally dense soup or beverage with more than 4% or more than 5% chicken protein is disclosed.

In another embodiment, a high protein liquid beverage formulated with chicken protein for complete nutrition of the elderly, children, or individuals with special needs. In another embodiment, the disclosed products may be formulated such that they complement the nutrition deficiency of the elderly, children, or individuals with special needs.

In another embodiment, a baked cracker enriched with chicken proteins at levels exceeding 20%, 25%, 30%, or 35% of the finished cracker weight is disclosed. In one aspect, the baked cracker delivers at least 9 grams of protein per 30 grams serving size.

In another embodiment, an extruded crouton enriched with chicken proteins at levels exceeding 20%, 25%, 30%, or 35% of the finished crouton weight is disclosed. In one aspect, the extruded crouton delivers at least 9 grams of protein per 30 grams serving size.

In another embodiment, the disclosure provides an extruded or baked crouton, enriched with chicken protein at an amount sufficient to be a source of dietary protein. In one aspect, the extruded or baked crouton offers a crispy way to fortify a salad with protein in a convenient crouton form.

In another embodiment, the disclosure provides an extruded crisp snack enriched with chicken protein at levels exceeding 5%, 8%, 10%, or 15% of the finished crisp snack and providing and delivering a minimum of 9 grams of protein per 30 grams serving size.

In another embodiment, the disclosure provides an extruded puff snack enriched with chicken protein at levels exceeding 5%, 8%, 10%, or 15% of the finished puff snack and providing and delivering a minimum of 9 grams of protein per 30 grams serving size.

In another embodiment, the disclosure provides high protein baked snack products, with sufficient levels of chicken protein to make an excellence source of protein and delivering a minimum of 9 grams of protein per 30 grams serving size.

In another embodiment, a baked or extruded product containing chicken proteins is disclosed, wherein the amount of chicken proteins is at least 20%, 25%, 30%, 40%, 50%, 60%, or 80% of the total protein in the baked or extruded product.

In another embodiment, the disclosure provides high protein extruded products made with chicken protein powder.

In another embodiment, the disclosure provides high protein ready-to-serve liquid food products made with predominately chicken protein.

In another embodiment, the products disclosed herein are processed by aseptic methods.

In another embodiment, the products disclosed herein are made by high temperature short time or ultra high temperature processing.

In another embodiment, the products disclosed herein are made by ultra high pressure processing.

In another embodiment, the products disclosed herein are made by a conventional canning process.

In another embodiment, the disclosed products may be formatted for consumption by humans and animals, for example, companion animals like dogs and cats.

In another embodiment, the disclosed products may be formatted especially for individuals who may have trouble swallowing.

In another embodiment, the disclosed products may be formatted as high nutrition products for infants who are weaning or learning to eat more solid foods.

The examples offered herein are not limiting, but intended to be illustrative of possible recipes and formulas that can be fulfilled with the protein products discussed Although each of the embodiments described herein has been illustrated with various components, it should be understood that the compositions and methods as described in the present disclosure may take on a variety of specific configurations or formulations and still remain within the spirit and scope of the present disclosure. Furthermore, suitable equivalents may be used in place of or in addition to the various components, the function and use of such substitute or additional components being held to be familiar to those skilled in the art and are therefore regarded as falling within the scope of the present disclosure.

Example 1 Meal Replacement Beverage

To prepare the nutritional liquid product disclosed herein, gum was dry blended with 200 g of sugar. The sugar/gum mixture was dispersed in 2,000 g of the water using a Silverson mixer. Chicken protein and salt were dispersed into the remaining batch water, and mixed well. The mix was stirred and heated to 120 F. Gum solution was added, continue heating to about 150 to 160 F, mix for 5 minutes. Blend vitamin/mineral premix with remaining sugar, add to above mix. Whisk in oil/lecithin, mix for 5 minutes. Add flavor, mix well. Process through microthermics: homogenize (2,000+500 PSIG), UHT hold 284 F, 6 seconds, cooled, and then bottled.

Formulations of several batches are shown in Table 1. Batches 2-5 were pre-homogenized offline and then UHT processed with homogenization bypassed. For Batch 1, it was difficult to disperse the CMC in 2,000 g of water, so the water was increased to 2,500 g. So Batch 1 was prepared and run through the microthermics. Batch 2 and 3 were prepared and pre-homogenized (2 stage 2,000/500) before UHT. Both of these batches were run through the 2 stage homogenization twice. On the first pass pressures had to be decreased slightly but on the second pass, they were processed at about 2,000 psi. Batch 4 and 5 were prepared and pre-homogenized as above but run through only once.

Appearance of the composition prepared in different batches was evaluated and compared. The results are shown below: Batch 1 had serum, about ½" on top. Batches 2-4 had no separation but have a mottled look. Batch 5 had stratified into 2 equal layers: lighter and darker.

Sensory taste of the different batches was also evaluated and compared. The results are shown below: Batch 1: Some grit, good viscosity, sweet, vanilla/brown sugar flavor with a chicken aftertaste. Batch 2: Thicker than Batch 1, clears well, less gritty, slightly less chicken aftertaste than Batch 1, otherwise similar in flavor to Batch 1. Batch 3: Fairly viscous, but definitely get grit, flavor is sweet and vanilla with low chicken aftertaste. Batch 4: Similar viscosity to Batch 3, similar grit to Batch 3, sweet with a "clean" chicken flavor-not off but definitely chicken flavor. Batch 5: Sediment noted in bottom of bottle, thin viscosity, very high grit and strong chicken and metallic aftertaste (due to vitamin preblend).

Example 2 Cracker Formula

To prepare the solid high protein composition, water was added to flour and yeast mixture in hobart mixing bowl. The mixture was mixed on speed one for one minute or until dough is picked up by McDuffy mixing blades. The mixture was then mixed on speed two for five minutes. The mixture was then transferred to a bowl, cover with plastic wrap and proof at 100 F for 3 hours.

TABLE 2

| Sponge ingredient | | | |
|---|---|---|---|
| Ingredient | Avg | % | g |
| AP Flour | 70.00 | 44.54 | 702.4 |
| Yeast, inst, dry | 0.23 | 0.15 | 2.3 |
| Water * | 30.00 | 19.09 | 301.0 |

The proofed dough was transferred to a hobart mixing bowl. The dough ingredients were added to sponge according to Table 3. Mix on Hobart, with McDuffy mixing blades speed #1 for 1 minute and speed #2 for 4 minutes. Hold dough for 1 hr at ambient temperature with a cover.

TABLE 3

| Dough ingredients | | | |
|---|---|---|---|
| Ingredient | Avg | % | g |
| AP Flour | 16.50 | 10.50 | 165.6 |
| IDF 3146 | 16.00 | 10.18 | 160.5 |
| water | 5.20 | 3.31 | 52.2 |
| Butter | 15.00 | 9.54 | 150.5 |
| Sod Bicarb | 0.63 | 0.40 | 6.3 |
| Garlic pwdr | 1.00 | 0.64 | 10.0 |
| Onion pwdr | 1.00 | 0.64 | 10.0 |
| White pepper | 0.20 | 0.13 | 2.0 |
| Salt | 1.40 | 0.89 | 14.0 |
| | 157.16 | 100.0 | 1577.0 |

On a Rondo type sheeter, Sheet to 1 mm and fold into 3 layers. Repeating Sheet to 1 mm and fold into 3 layers. Sheet to 1 mm and score into cracker's desired size, dock crackers with a fork. Transfer dough sheet to impingement oven and bake at 285 F for 6:30 minutes. Brush a light coating of vegetable oil on both sides of crackers immediately out of oven. Break crackers into individual pieces along scored lines. Place crackers into bag with seasoning mix (90% Hidden Valley ranch seasoning mix, 10% flour salt) and shake to coat crackers. Transfer crackers onto a screen and bounce to remove excess seasoning. Allow crackers to thoroughly cool before packaging into sealed pouches.

Changes may be made in the above methods and compositions without departing from the spirit of the instant disclosure. It should be noted that the matter contained in the above description should be interpreted as illustrative and not in a limiting sense. The following claims are intended to cover generic and specific features described herein, as well as statements of the scope of the present methods and compositions, which, as a matter of language, might be said to fall there between.

All references cited in this disclosure, including patents, patent applications, scientific papers and other publications, are hereby incorporated by reference into this application.

I claim:

1. A solid composition comprising
poultry protein, and
flour,
wherein said composition comprises at least 10% (w/w) of poultry protein, and said composition is in a form selected from the group consisting of a crouton, a cracker, a chip, and a puff ball, wherein said poultry protein is derived from poultry meat.

2. The solid composition of claim 1, wherein said composition comprises at least 30% (w/w) of the poultry protein.

3. The solid composition of claim 1, wherein said composition is baked or extruded into the form.

4. The solid composition of claim 1, wherein said composition is the form of the crouton.

5. The solid composition of claim 1, wherein said composition is the crouton that has been baked or extruded.

6. The solid composition of claim 5, wherein said composition is used in salad.

7. The solid composition of claim 1, wherein said flour is selected from the group consisting of wheat flour, soy flour, corn flour, lentil flour, barley flour and combination thereof.

8. The solid composition of claim 1, wherein said flour is gluten free.

9. A method of making the solid composition of claim 1.

10. A method of using the solid composition of claim 1 as a snack or in a salad.

* * * * *